United States Patent [19]

Popek

[11] Patent Number: 4,886,345
[45] Date of Patent: Dec. 12, 1989

[54] ELECTRO-OPTICAL PHASE MODULATOR

[75] Inventor: Marc H. Popek, Indian Harbour Beach, Fla.

[73] Assignee: Harris Corporation, Melbourne, Fla.

[21] Appl. No.: 228,655

[22] Filed: Aug. 5, 1988

[51] Int. Cl.$^4$ ............................................. G02F 1/01
[52] U.S. Cl. ................................. 350/355; 350/384; 350/392; 350/388
[58] Field of Search ............... 350/355, 356, 384, 385, 350/386, 388, 392, 353, 374

[56] References Cited

U.S. PATENT DOCUMENTS

| 3,791,718 | 2/1974 | Chow | 350/160 R |
|---|---|---|---|
| 3,804,489 | 4/1974 | Li et al. | 350/160 R |
| 4,240,696 | 12/1980 | Tracy et al. | 350/355 X |
| 4,396,252 | 8/1983 | Turner | 350/355 |
| 4,618,819 | 10/1986 | Mourou et al. | 324/77 K |

FOREIGN PATENT DOCUMENTS 0023359  2/1977  Japan ................................. 350/392

OTHER PUBLICATIONS

White et al, "Electro-Optical Modulators Employing Intermittent Interaction", IEEE, Jan. 1963, p. 214.
A. Yariv, "Optical Modulators", copyright 1985, Chapter 9, Holt, Rinehart and Winston.

Primary Examiner—Eugene R. LaRoche
Assistant Examiner—Nathan W. McCutcheon
Attorney, Agent, or Firm—John L. DeAngelis, Jr.

[57] ABSTRACT

An electro-optical phase modulator. The electro-optical modulator incorporates a stripline configuration with a bottom ground plane attached to the bottom surface of the crystal and a signal conductor that is affixed to the top surface of the crystal. The signal conductor is separatred from a top ground plane by a dielectric, usually air. The top ground plane also overhangs the sides of the crystal to lower the effective dielectric constant of the modulating signal that is applied to the signal conductor. In this way, the electric field established in the crystal by the modulating signal has a speed more nearly equal to the speed of the optical beam that passes through the crystal and is modulated by the electrical signal.

5 Claims, 2 Drawing Sheets

ELECTRO-OPTICAL PHASE MODULATOR

This invention was made with Government support under contract No. F30602-86-C-0091. The government has certain rights in this invention.

FIELD OF THE INVENTION

This invention relates to an electro-optical phase modulator having a stripline configuration to achieve phase modulation of the optical signal over a wide bandwidth.

BACKGROUND OF THE INVENTION

In an electro-optical modulator a changing electrical signal (also known as a modulating or control signal) is impressed between a pair of electrodes mounted on opposite faces of a crystal to create electric field stresses within the crystal. An optical signal is propagated through the crystal in a direction perpendicular to the electric field between the electrodes, so that the intermittent interaction between the modulating electrical field and the optical field modulates the optical light beam. Maximum interaction, and thus modulation, occurs when the light beam and electric field are in phase synchronism.

This principle of intermittent interaction in an electro-optical modulator is described in numerous publications, such as "Electro-optical Modulators Employing Intermittent Interaction", by White et al, in the Proceedings of the Institute of Electrical and Electronic Engineers, January 1963, page 214. To achieve meaningful phase modulation of the light beam requires a finite interaction length between the modulating electrical signal and the optical signal. This interaction length is set by the crystal material.

The interaction between the electric field and the light beam produces Faraday phase rotation (or phase modulation) of the light beam. For example, a slowly changing electrical signal can produce a phase modulation of 10° per centimeter, meaning that for every centimeter the lightwave travels through the crystal its electric and magnetic fields rotate by 10 degrees. Using an electrical signal with a faster rate of change can produce phase modulation of 90° per centimeter. In this latter example an on/off modulator could be constructed by sending the modulated light beam exiting from the crystal through a polarizer, which would allow light to pass only at certain phase angles.

To obtain high-frequency phase modulation requires the use of a high-speed electrical signal on the electrodes and a wide band electro-optical modulator. The limitation on modulation bandwidth is due to the differing velocities of the electric field created by the electrical control signal and the optical light beam. The phase velocity of the propagating RF field created by the electrical signal must be substantially the same as the light velocity in the crystal to extend the phase modulation affect over a wide bandwidth of modulation frequencies. The problem of differing wave velocities arises due to the differing dielectric constant applicable to the light and the RF signal. The ratio of the light velocity to the RF velocity is given below.

$$\frac{V_{light}}{V_{RF}} = \frac{\sqrt{\epsilon_{r\ light}}}{\sqrt{\epsilon_{r\ RF}}}$$

In material commonly used for electro-optical modulators (for example, Lithium Niobate or Lithium Tantalate) with a microwave RF signal for modulating the optical beam this ratio can be approximately 10:1 or 20:1. That is, the electric field travels ten (or twenty) times slower than the propagating light beam, which limits the interaction length because the light and RF signals must be traveling at the same speed through the interaction length. But a longer required interaction length translates into a narrower bandwidth for the RF modulating signal. If a light beam is propagated through the crystal and during that time a dc electrical control signal is placed on the crystal electrodes, the light beam will be phase modulated, i.e., the electric and magnetic fields will rotate. As the frequency of the control signal is increased above dc, the electric and magnetic fields of the light rotate in response to the changing electric field to produce phase modulation. At a very high frequency it takes a finite time for the electric field to be established from one crystal electrode to the opposite electrode. The propagating light beam also takes a finite time to pass through the crystal. Thus, at some frequency the light will pass through the crystal before the electric field is completely established, and the phase modulation effect will continuously diminish as the frequency of the electrical control signal increases. The frequency at which the modulation decreases by one-half defines the 3 dB bandwidth of the electro-optical modulator.

As an example of this effect, using a lithium tantalate (LiTa$_3$) crystal yields a relative dielectric of eight for a RF electrical control signal up to approximately 15 GHz. The effective dielectric constant of a HeNe laser light of 632.8 nm (red light) is two. As a result, the electric field RF wave propagates at approximately ¼ the rate of the optical wave. For an embodiment where it is desireable to create 90° phase rotation (or 90° phase shifting) typical prior art geometries for the electro-optical modulator limit the bandwidth of the RF signal to approximately 300 MHz.

There are several known prior art electro-optical phase modulators that attempt to correct the difficulties discussed above. One prior art device solves the synchronization problem by employing a straight stripline conductor and segmented electro-optical crystals. This results in short interaction lengths, a large number of optical interfaces, mechanical complexity, and unreliability. Another technique causes the light beam and the RF electrical signal to travel along different but intersecting paths through the crystal. Interaction then occurs only at the discrete points where the two paths intersect and constructive cumulative interaction will occur if at the interaction the phase of the modulating RF signal is the same as that of the modulation already impressed on the light beam. Another prior approach has been to employ a straight stripline conductor and pass the light beam under the stripline several times. This technique proved unsatisfactory because the light beam and the modulating wave were not traveling in the correct direction during the modulation interactions and again because the interaction length is short. U.S. Pat. No. 3,791,718 (Chow) utilizes a meandering microstrip configuration under which the light beam passes several times. The conductive strip is disposed on a crystal surface so that the traveling wave produced by the modulating electrical signal is traveling in the same direction as the light beam when the interaction occurs. The light beam is reflected at an angle between the two side surfaces of the crystal so that during a part of the time that the light beam is passing from one side of the crystal to the other it passes under the conductor disposed on the surface of the crystal, in the same direction as it is traveling. Thus this prior art technique uses only a single electro-optical crystal to provide a relatively long interaction length and to allow the interaction to occur when both waves are traveling in the same direction.

FIG. 1 illustrates yet another prior art technique where an electro-optical modulator 6 includes an electrode 8 located on the top surface of a crystal 10 (for example lithium niobate or lithium tantalate), with an electrode 12 placed on the bottom surface thereof. The electrodes 8 and 12 form a microstrip conductor. An electrical modulating or control signal is applied to the electrode 8 to create a vertical electric field in the crystal structure. A light beam 14 is injected into the crystal in the direction shown in FIG. 1 so that it is perpendicular to the electric field. This embodiment has a limited bandwidth (approximately 300 MHz) due to the differing velocities of the electric field and the optical beam in the crystal 10, as discussed above.

Another prior art technique is illustrated in FIG. 2 where an electrode 16 replaces the electrode 8. The electrode 16 which is attached to or proximate the crystal 10, is made larger than the width of the crystal 10 so that some portion of the electrode 16 overhangs the crystal 10. The modulating electrical signal is applied to the electrode 16, and since the overhanging area samples an area of lower dielectric constant (i.e., the air) the combined effective dielectric between the electrodes 12 and 16 is lower than that experienced in the FIG. 1 embodiment. Looking at the formula above, if the effective dielectric constant is lower in this FIG. 2 embodiment, the speed of the modulating RF signal is increased, improving the bandwidth of the electro-optical modulator 6. Using typical crystal structures, the FIG. 2 embodiment is limited to a bandwidth of approximately 750 MHz.

The overhang cannot be increased without bound because a point will be reached where more than one mode will propagate in the transmission line structure formed by the electrodes 12 and 16. Multi-moding produce standing waves that will deleteriously affect the desired phase modulation of the optical beam 14. Further, the overhang dissipates energy outside of the crystal so that a higher level electrical modulating signal is required to modulate the optical beam. Thus while the overhang allows an increased bandwidth, it lowers the gain of the system and thus there would be little if any increase in the gain-bandwidth product.

SUMMARY OF THE INVENTION

The disadvantages discussed above can be overcome with the electro-optical modulator structure defined by the present invention. The present invention utilizes an offset stripline transducer that is modified to control the phase velocity through the crystal. The embodiment of the present invention utilizes a ground plane affixed to the bottom surface of the crystal, a signal conductor affixed to the top face of the crystal and a second ground plane conductor above the signal conductor. This stripline configuration increases the phase velocity for fixed size ground planes (both top and bottom) thus increasing both the bandwidth and the gain-bandwidth product. The efficiency of the device is better than the prior art devices because the electric field density is higher inside the crystal with a stripline configuration, rather than the microstrip configurations of the prior art. In one embodiment the bandwidth for this device can be extended to approximately 2 GHz.

BRIEF DESCRIPTION OF THE DRAWINGS

The present invention may be better understood, and the further advantages and uses thereof more readily apparent, when considered in view of the following detailed description of exemplary embodiments, taken with the accompanying drawing in which.

DETAILED DESCRIPTION OF THE PREFERRED EMBODIMENTS

Figure 3:
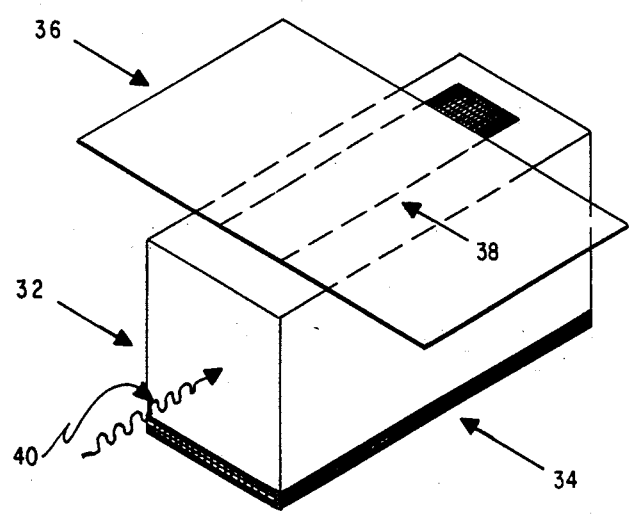
FIGS. 3 and 4 illustrate electro-optical modulators constructed according to the teachings of the present invention.

FIG. 3 illustrates an electro-optical modulator 30 constructed according to the teaches of the present invention. The electro-optical modulator 30 includes a crystal 32, a lower ground plane 34, and an upper ground plane 36. The modulating electrical signal is applied to a signal conductor 38. As compared to the prior art signal conductors that overhang the crystal, the signal conductor 38 of the present invention is limited in dimensions to the size of the face of the crystal 32 to which the signal conductor 38 is attached.

The lower ground plane 34, the upper ground plane 36, and the signal conductor 38 form a stripline transmission line. The upper ground plane 36 extends beyond both sides of the crystal 32 as shown in FIG. 3. In other words embodiments the upper ground plane 36 extends beyond only one side of the crystal 32. In other embodiments the lower ground plane 34 may also be extended beyond the longitudinal vertical faces of the crystal 32.

Figure 1:
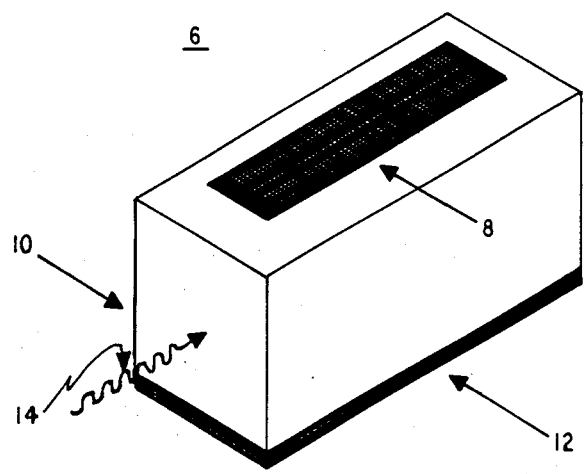
FIGS. 1 and 2 illustrate prior electro-optical modulators.
Figure 2:
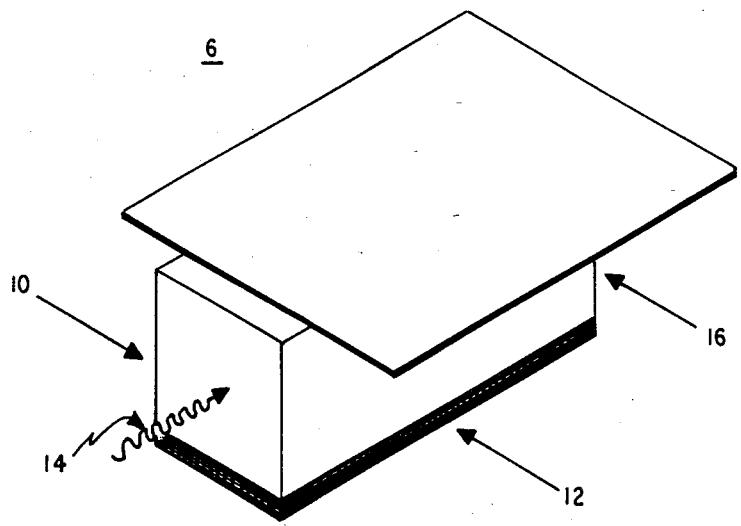
Figure 4:
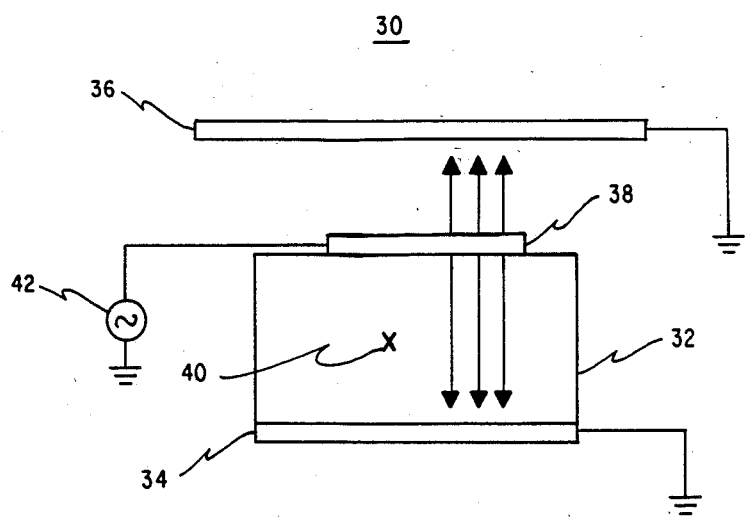

FIG. 4 is an end view of the electro-optical modulator 30 shown in FIG. 3. The lower ground plane 34 and the upper ground plane 36 are connected to ground. A signal source 42 drives the signal conductor 38. FIG. 4 more clearly illustrates the air gap between the upper ground plane 36 and the signal conductor 38. In other embodiments the gap of air can be replaced by another material having a low dielectric constant. As is known by those skilled in the art, an electric field propagates along the stripline conductor formed by the lower ground plane 34, the upper ground plane 36, and the signal conductor 38; a few exemplary electric field vectors are shown in FIG. 4. The portion of the electric field between the signal conductor 38 and the upper ground plane 36 samples the upper dielectric (air) material to produce a lower effective dielectric constant for the entire structure. As a result, the portion of the field in the air gap travels faster than the portion in the crystal 32, so that the resultant electric field travels faster than the portion through the crystal, but slower than the portion traveling solely through the air. Because the electric field travels faster, the modulating signal has a longer interaction length with the optical light beam for more efficient modulation. Increasing the speed of the resultant to more closely approach the speed of the optical beam 40, provides a wider operational bandwidth; in one embodiment the bandwidth is approximately 2 GHz. The present invention also offers lower losses because no portion of the electric field is outside of the crystal 32. This compares to the FIG. 2 embodiment where a substantial portion of the electric field is outside the boundaries of the crystal 10. These lower losses result in higher gain for the structure of the present invention and thus the present invention has a higher gain-bandwidth product than that offered by the prior art.

The electro-optical modulator 30 offers two important advantages over the prior art modulators. First, the electro-optical modulator 30 increases the available bandwidth for the modulating signal that is applied to the signal conductor 38. Second, the electric field stress created by the modulating signal is concentrated in the crystal 32. In one embodiment the bandwidth can be three times greater that that of the prior art electro-optical modulators. Because the signal conductor 38 has a narrower width than the top surface of the crystal 32 the electric field is concentrated within the crystal 32. Thus the phase rotation per unit of energy drive is increased beyond that offered by the microstrip configured prior art electro-optical modulators. Together, these improvements optimize both the gain and the bandwidth of the present invention.

While I have shown and described several embodiments in accordance with the present invention, it is understood that the same is not limited thereto but is susceptible of numerous changes and modifications as known to a person skilled in the art and I therefore do not wish to be limited to the detail shown and described herein, but intend to cover all such changes and modifications as are obvious to one of ordinary skill in the art.

What is claimed is:

1. An electro-optical phase modulator comprising;
   a crystal having top and bottom parallel surfaces and an end surface, wherein said end surface is adapted to receive light to be modulated;
   a bottom ground plane proximate said bottom surface;
   a top ground plane proximate said top surface, wherein said top ground plane overhangs said top surface;
   a signal conductor disposed between said top surface and said top ground plane, wherein said signal conductor is adapted to receive a modulating signal for modulating the light passing through said crystal.

2. The electro-optical phase modulator of claim 1 wherein a gap is formed between the signal conductor and the top ground plane, and wherein said gap is filled with a material having a low dielectric constant.

3. The electro-optical phase modulator of claim 2 wherein the gap is filled with air.

4. The electro-optical phase modulator of claim 1 wherein the bottom ground plane is mounted upon the bottom surface, and wherein the bottom ground plane is the same size as the bottom surface.

5. The electro-optical phase modulator of claim 1 wherein the signal conductor is affixed to the top surface of the crystal.

* * * * *